(12) United States Patent  
Demulder et al.

(10) Patent No.: US 8,069,780 B2
(45) Date of Patent: Dec. 6, 2011

(54) MODULAR BALER PLUNGER

(75) Inventors: Carl Frans Demulder, Ottumwa, IA (US); Jashua Jay Gnewuch, Bloomfield, IA (US)

(73) Assignee: Deere & Company, Moline, IL (US)

(*) Notice: Subject to any disclaimer, the term of this patent is extended or adjusted under 35 U.S.C. 154(b) by 262 days.

(21) Appl. No.: 12/410,938

(22) Filed: Mar. 25, 2009

(65) Prior Publication Data

US 2010/0242749 A1 Sep. 30, 2010

(51) Int. Cl.
*B30B 1/00* (2006.01)

(52) U.S. Cl. .................. 100/179; 100/19 R; 100/295

(58) Field of Classification Search ............ 100/3, 19 R, 100/24, 178, 179, 240, 245, 295
See application file for complete search history.

(56) References Cited

U.S. PATENT DOCUMENTS

| | | | |
|---|---|---|---|
| 4,372,104 A * | 2/1983 | Simonis et al. | 56/341 |
| 4,627,341 A * | 12/1986 | Sudbrack et al. | 100/41 |
| 4,829,756 A * | 5/1989 | Schrag et al. | 56/341 |
| 4,945,719 A | 8/1990 | Schrag et al. | |
| 5,945,132 A * | 8/1999 | Sullivan et al. | 425/143 |
| 2005/0056165 A1 | 3/2005 | Roth | |

FOREIGN PATENT DOCUMENTS

| | | |
|---|---|---|
| DE | 206026 C | 1/1909 |
| DE | 20201417 U1 | 5/2002 |
| GB | 833650 A | 4/1960 |

OTHER PUBLICATIONS

European Search Report received Jun. 21, 2010 (4 pages).

* cited by examiner

*Primary Examiner* — Jimmy T Nguyen

(57) ABSTRACT

A large square baler includes a crop compressing plunger constructed in a modular fashion comprising a main support frame to which right and left plunger end sections and a plurality of identical individual cast plunger middle sections are bolted in side-by-side, spaced relationship to each other, with the space between adjacent sections defining a pathway through which a twine-delivery needle may pass to deliver twine to a knotter assembly when it is desired to secure a formed bale by tying lengths of twine about the bale.

8 Claims, 6 Drawing Sheets

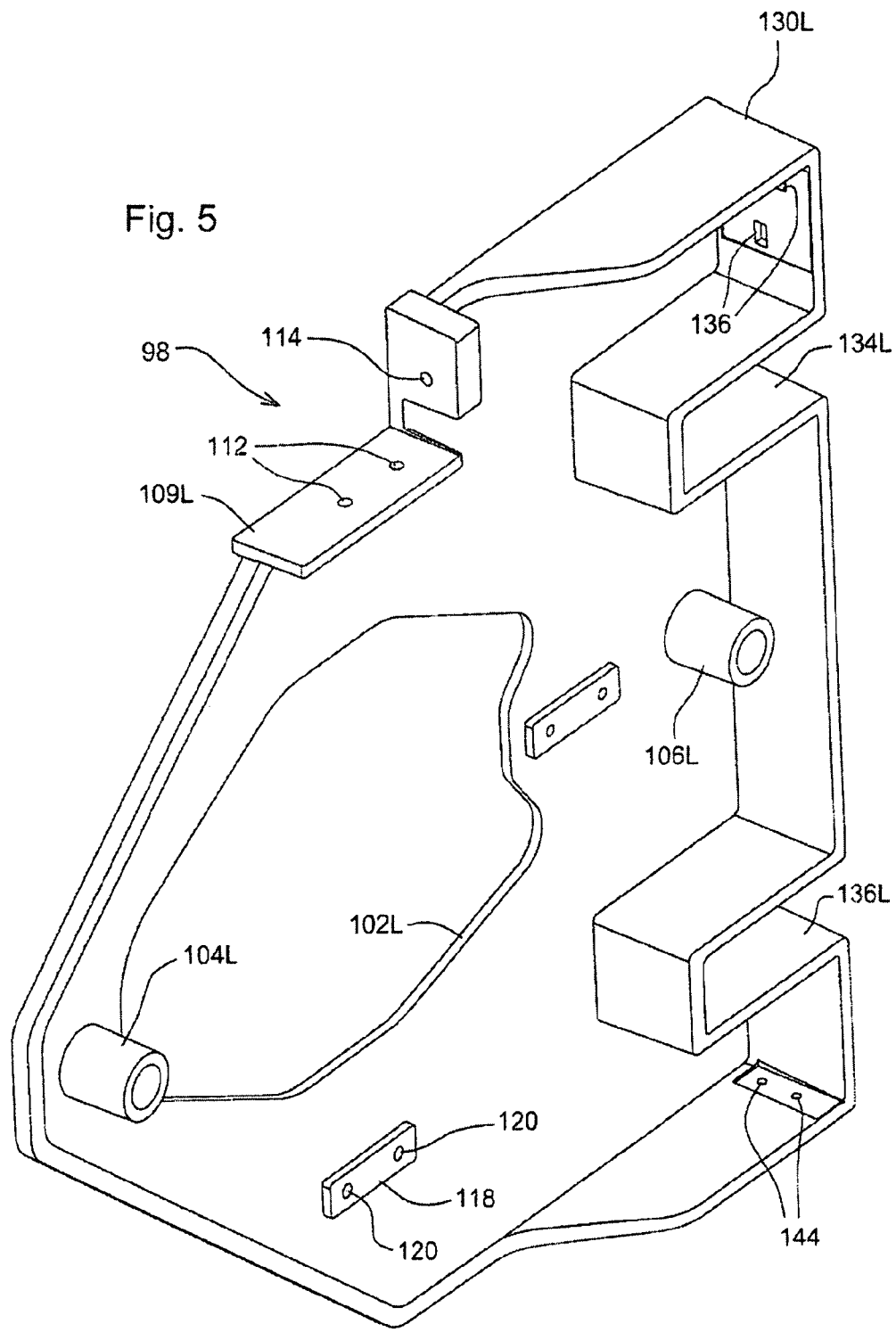

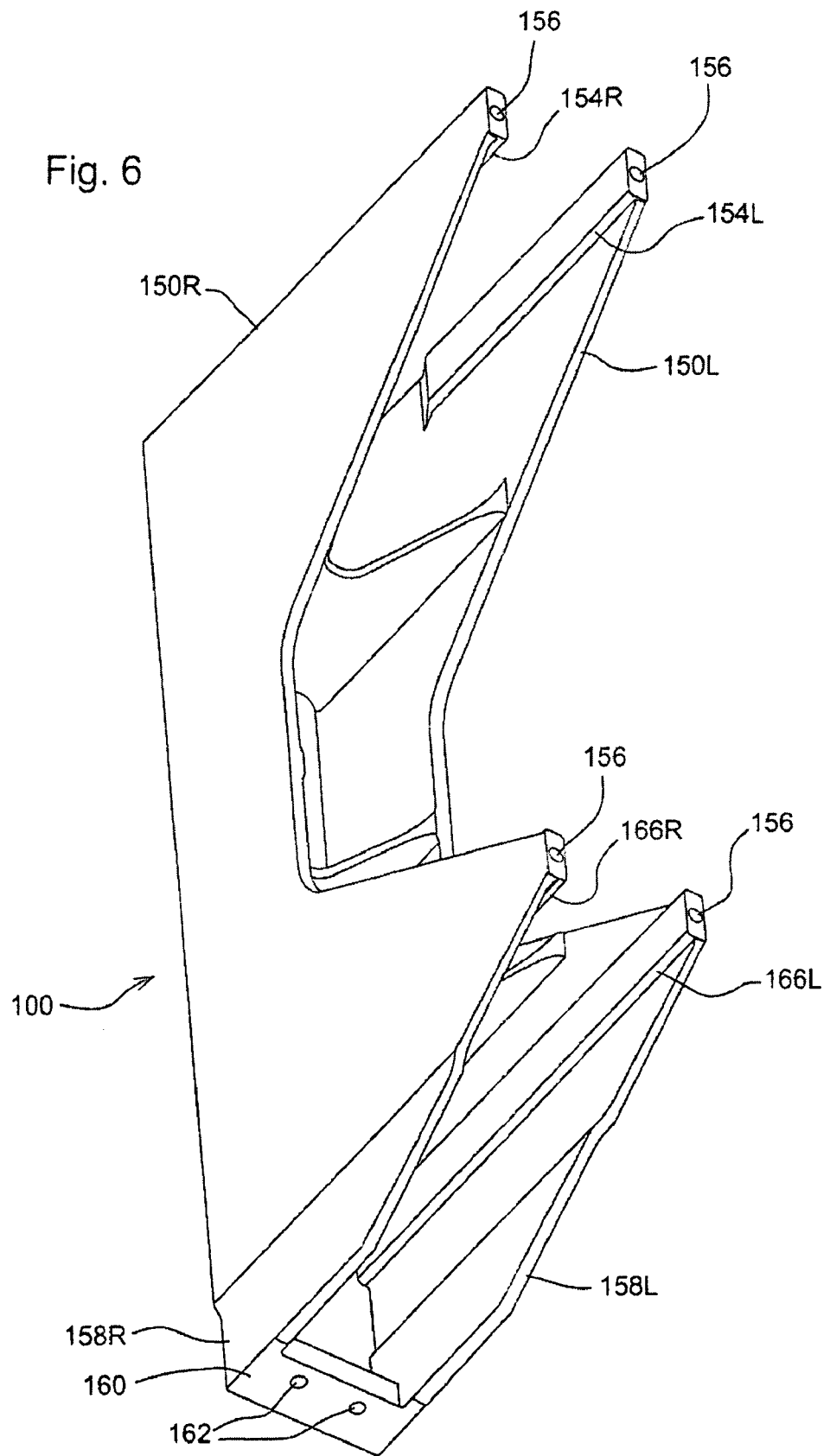

MODULAR BALER PLUNGER

FIELD OF THE INVENTION

The present invention relates to balers for making large parallelepiped bales, and more particularly, relates to plungers for such balers.

BACKGROUND OF THE INVENTION

Modern plunger designs require complex sheet metal weldments. The weldments are made up of stiffeners, cross-members, needle guides, shim rollers or plates, plunger guide skis and knives. This type of construction results in high production costs. Additionally, when plunger damage occurs, serviceability to repair damaged sections is very difficult as it may require the entire plunger to be removed even though the damage may be localized.

SUMMARY OF THE INVENTION

According to the proposed invention, there is provided an improved baler plunger construction, and more specifically, there is provided a construction which overcomes the aforementioned drawbacks of the prior art plungers.

An object of the invention is to provide a simple baler plunger construction which may be easily repaired.

The foregoing object is accomplished by making the baler plunger of a modular design so as to include a main carrier frame to which a plurality of cast plunger sections are bolted in side-to-side relationship to each other.

This and other objects will become apparent with a reading of the ensuing description together with the appended drawings.

BRIEF DESCRIPTION OF THE DRAWINGS

FIG. 5 is a left front perspective view of the right-hand plunger end section.

FIG. 6 is a lower, left front perspective view of one of the plunger middle sections.

DESCRIPTION OF THE PREFERRED EMBODIMENT

Figure 1:
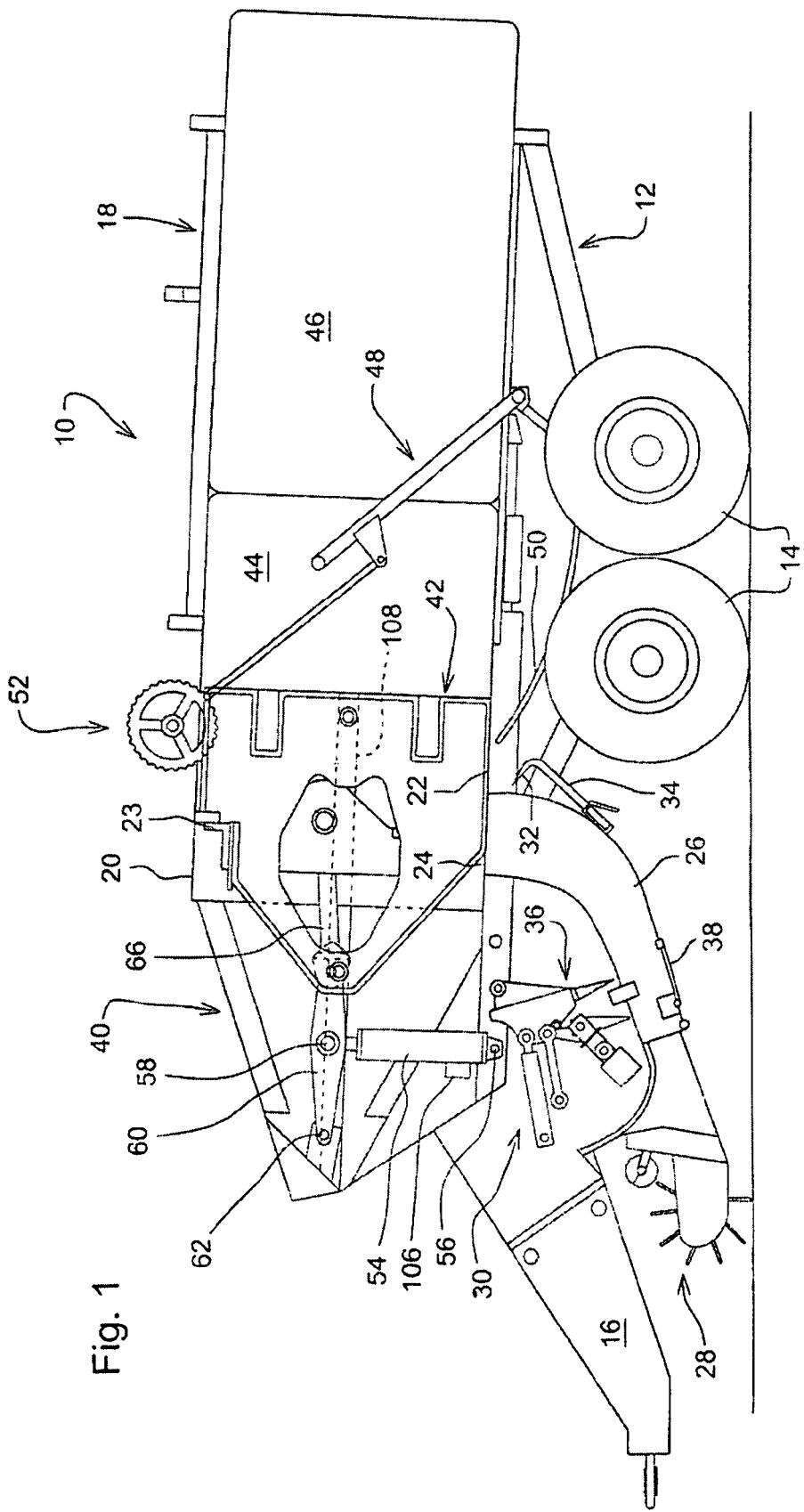
FIG. 1 is a schematic left side view of a large square baler having left side structure removed to reveal the inside of the baling chamber.

Referring now to FIG. 1, there is shown a baler 10 for forming large parallelepiped bales and including a main frame 12 supported on a tandem set of ground wheels 14. A draft tongue 16 projects forwardly from the front of the frame 12 and is adapted for attachment to a towing vehicle such as an agricultural tractor, not shown. A baling chamber 18 includes parallel top and bottom walls 20 and 22, respectively, and opposite, parallel side walls 23, which are all arranged so that the baling chamber 18 has a square or rectangular cross section. The bottom wall 22 is provided with a crop inlet 24 to which is coupled the upper end of a pre-compression chamber 26 in the form of a duct that curves upwardly and rearwardly from a crop pick-up 28. Located in the region between the pick-up 28 and the pre-compression chamber 26 is a feeder fork arrangement 30 that operates to positively move crop into the forward end of the chamber 26. Transversely spaced tines 32 of a pivotally mounted crop blocking fork 34 are selectively movable between forwardly pivoted, crop-retaining position, wherein they extend over an upper edge of a back wall of the pre-compression chamber 26 and into the chamber 26 at a location adjacent the baling chamber inlet 24, and a rearwardly pivoted crop-release position, (as shown) wherein they are removed from the pre-compression chamber 26 for permitting an accumulated charge of crop to be moved into the baling chamber 18 through operation of a stuffing fork 36 having transversely spaced tines that move down through slots provided in a front wall of the pre-compression chamber, and then sweep upwardly through the chamber 26 to move the charge of crop into the baling chamber 18. Appropriate actuators, not shown, are associated with the blocking fork 34 and stuffing fork 36, and are associated with controls that are sequenced to effect retraction of the blocking fork 34 and then operation of the stuffing fork 36 once the charge of crop has reached a preselected density as determined by a spring loaded, density sensing door 38.

Once the charge of crop has been moved into the baling chamber 18, it is moved rearwardly by operation of a plunger drive 40 acting on a plunger 42 which compresses the charge of crop against a partially formed bale 44 and a completely formed bale 46 which has already been bound together by several transversely spaced loops of twine that have been placed there by operation of a twine tying arrangement comprising a needle yoke 48, which is pivotally mounted and includes a plurality of laterally spaced needles 50 for delivering twine to a knotting arrangement 52 mounted across the top wall 20 of the baling chamber, by way of slots (not shown) provided in the bottom wall 22 of the baling chamber 18.

The plunger drive 40 may be of any known construction, but here is disclosed as including an extensible and retractable hydraulic drive cylinder 54 having its cylinder end anchored to the frame 12 by a coupling pin 56, and having its rod end pivotally coupled, as at a pin 58, to a crank arm 60. The crank arm 60 is mounted for oscillating about a horizontal transverse axis defined by a pin 62 coupling the forward end of the crank arm 60 to the frame 12. The rear end of the crank arm 60 is pivotally coupled, as by a coupling pin 64, to the forward ends of a parallel pair of transversely spaced connecting rods 66 having their rear ends pivotally coupled to the plunger 42 by respective coupling pins 68. The hydraulic drive cylinder 54 is shown retracted in FIG. 1, this position corresponding to that where the plunger 42 is fully extended so that its rear face is located to the rear of the inlet 24 to the baling chamber 18, with extension of the cylinder 54 causing the plunger 42 to move forwardly to a position wherein the rear face of the plunger 42 is located forwardly of the chamber inlet 24.

Figure 2:
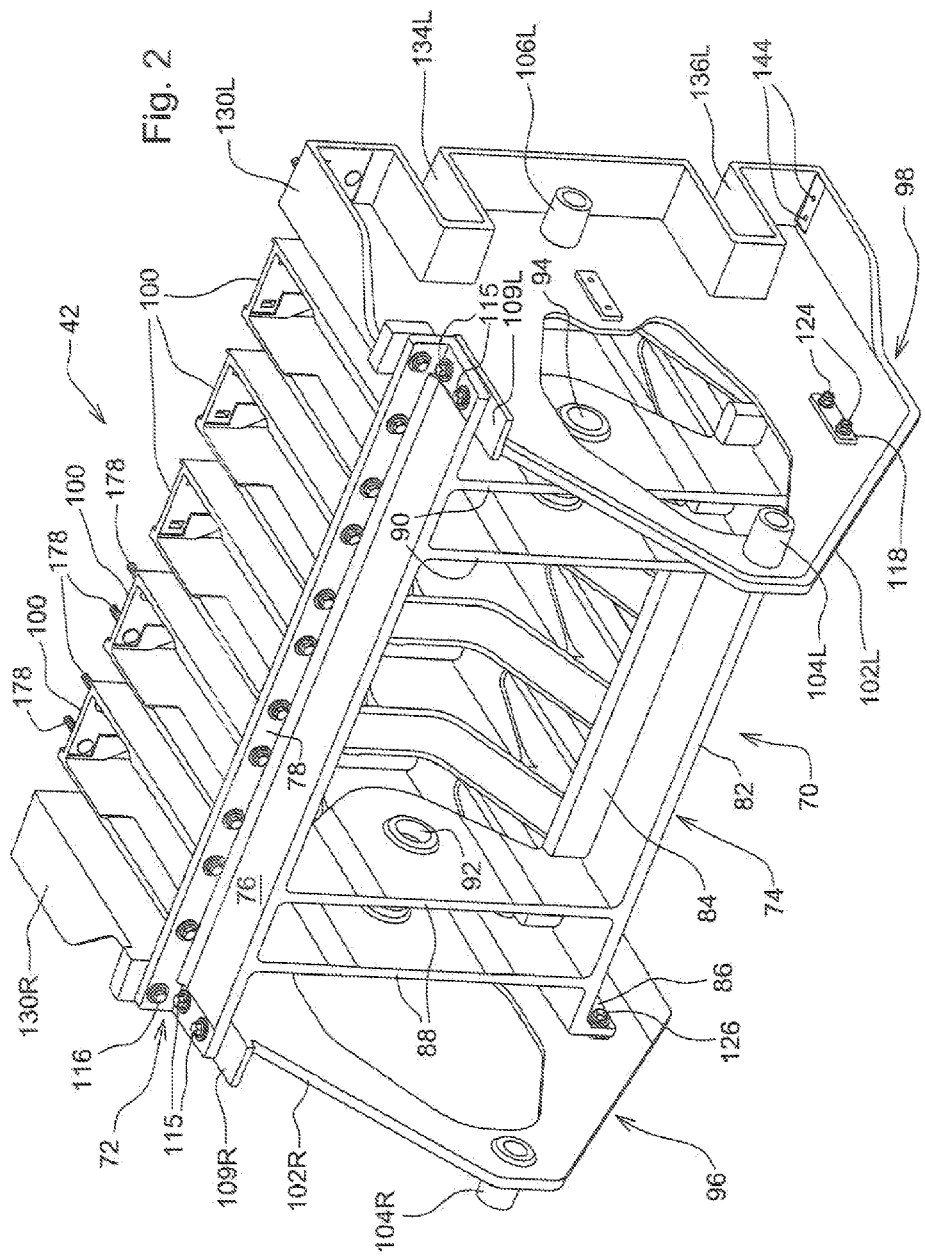
FIG. 2 is a left front perspective view of a baler plunger constructed in accordance with the principles of the present invention, with parts being removed to show mounting structure.
Figure 3:
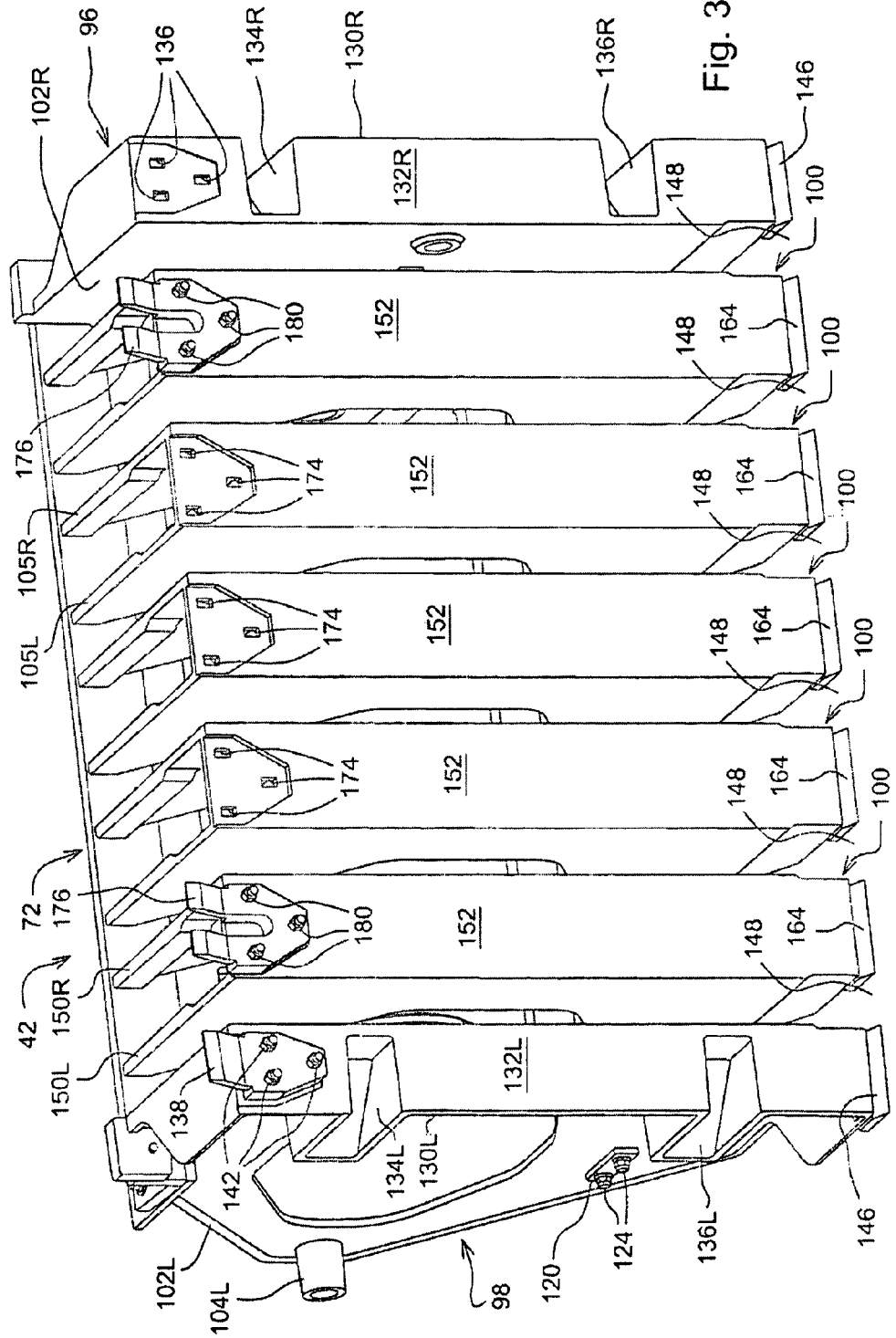
FIG. 3 is a left front perspective view of the baler plunger shown in FIG. 2.
Figure 4:
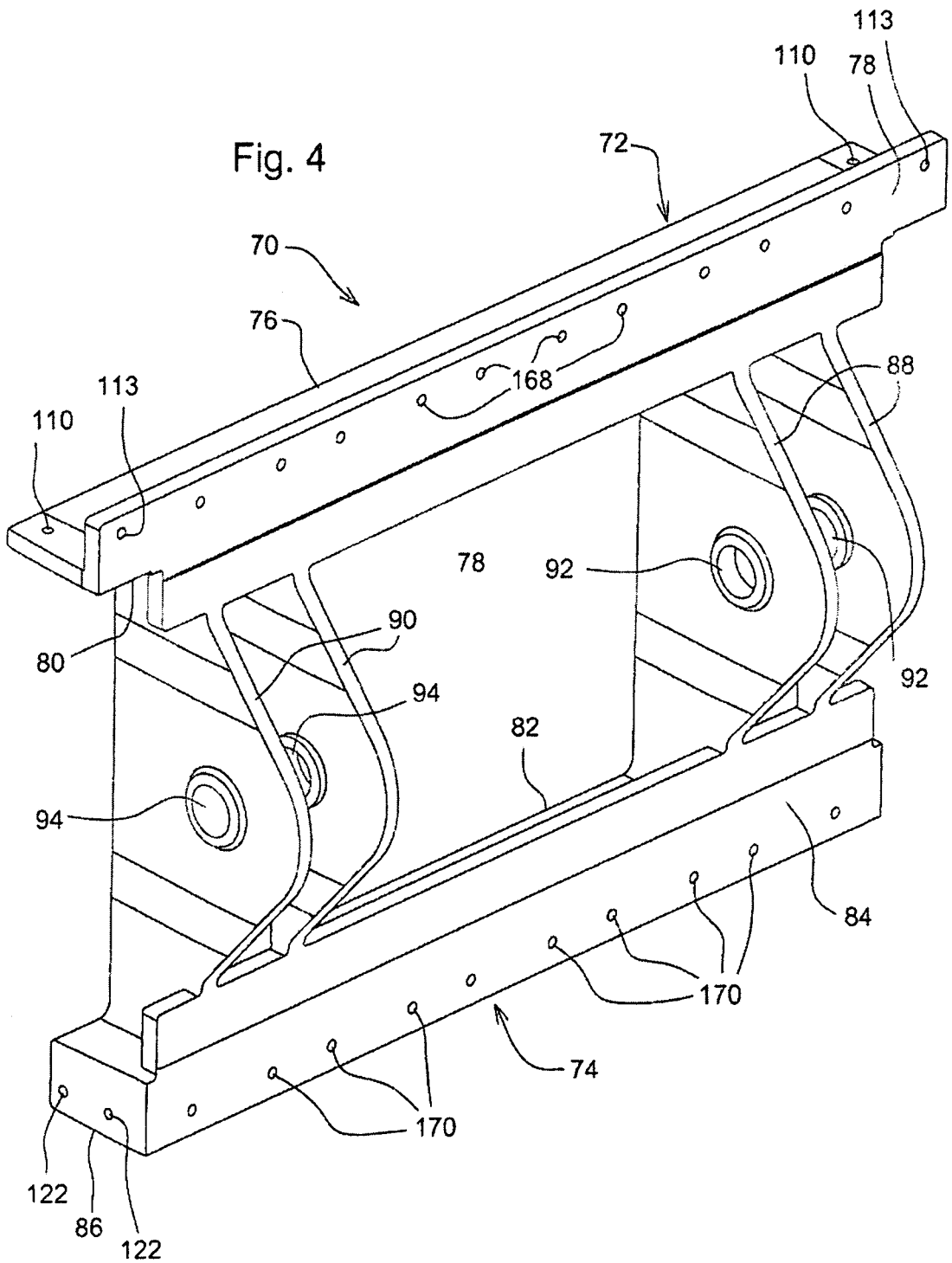
FIG. 4 is a right front perspective view of the support frame of the plunger.

Referring now also to FIGS. 2, 3 and 4, it can be seen that the plunger 42 is of a modular construction and includes a carrier frame 70 including vertically spaced, parallel, top and bottom cross members 72 and 74, respectively, which for the main part are T-shaped in cross section. The stem of the T of the top cross member 72 is defined by a horizontal plate 76 having a top surface machined at its opposite ends to define mounting surfaces, with a rear edge of the plate 76 being joined along its length to a vertical rear rectangular plate 78, which defines the top of the T and includes a machined upper mounting surface. Lower corner regions at the opposite ends of the vertical plate 78 are removed to define notches 80 having a purpose explained below. The stem of the T of the bottom cross member 74 is defined by a horizontal plate 82 having a rear edge joined along its length to a vertical rear rectangular plate 84 disposed in co-planar relationship to the vertical plate 78 of the top cross member 72 and defining the top of the T. Fore-and-aft extending, vertical mounting flanges 86 are joined to opposite ends of each of the horizontal plate 82 and a lower part of the vertical plate 84. Extending between, and having opposite ends welded to, right and left end regions of the top and bottom cross members 72 and 74 are right and left pairs of fore-and-aft extending, parallel, vertical connecting rod mounting plates 88 and 90, respectively. The pairs of mounting plates 88 and 90 are generally configured as equilateral triangles with front sides of the plates being disposed vertically and with front sides of the plates including rounded forward corners disposed forwardly of first and second sets of axially aligned, horizontal cylindrical bushings 92 and 94, respectively, that are provided in middle regions of the right and left pairs of upright members 88 and 90 and serve to receive the mounting pins 68 for connecting the right and left connecting rods 66 to the plunger 42.

Referring now also to FIGS. 5 and 6, it can be seen that the plunger 42 includes right and left plunger end sections 96 and 98, respectively, and five identical middle plunger sections 100. The right and left plunger end sections 96 and 98 are mirror images of each other, with only the left plunger end section 98 being shown in detail (see FIG. 5) and with it to be understood that any feature described as pertaining to the left plunger end section 98 also pertains to the right plunger end-section 96. The plunger end sections 96 and 98 are each in the form of a casting and respectively include fore-and-aft extending, main body portions in the form of vertical flat plates 102R and 102L having rear regions including top and bottom edges which converge forwardly to respective corner regions provided with horizontal, outwardly projecting, cylindrical, front roller axle mounts 104R and 104L that are in axial alignment with each other. Identical rear roller axle mounts 106R (not visible) and 106L are respectively provided at rear regions of the plates 102R and 102L in horizontal alignment with the front axle mounts. Rollers (not shown) carried on axles received in the mounts are received within horizontal roller guide tracks 108 (see FIG. 1) provided in the side walls 23 of the baling chamber 18 so as to prevent the plunger 42 from cocking up or down within the baling chamber 18 during operation. Formed integrally with the upper edges of the plates 102R and 102L are L-shaped mounting pads 109R and 109L, with opposite ends of the horizontal and vertical plates 76 and 78, respectively, of to top cross member 72 of the frame 70 engaging the pads, with it being noted that the notches 80 permit the vertical plate 78 be located on top of the mounting pads. The opposite ends of the horizontal plate 76 are each provided with a pair of mounting holes 110 that are disposed in axial alignment with holes 112 provided in a horizontal leg of each of the pads 109R and 109L, while horizontal holes 113 provided in opposite ends of the vertical plate 78 are disposed in alignment with threaded bores 114 provided in the vertical leg of each of the pads 109R and 109L. For securing the cross member 72 of the frame 70 to the plunger end sections 96 and 98, first mounting bolts 115 are inserted through the aligned holes 110 and 112 and have threaded ends receiving nuts (not visible), while second mounting bolts 116 are inserted into the holes 113 and threaded into the bores 114. Provided on each of the plates 102R and 102L so as to be in horizontal alignment with the mounting flanges 86 is a mounting pad 118 that contains a pair of horizontally disposed holes 120 that are aligned with a pair of holes 122 provided in each of the flanges 86, with bolts 124 being received in the aligned holes and having nuts 126 tightened onto inner threaded ends so as to secure central lower regions of the module end sections 96 and 98 to lower cross member 74 the frame 70.

The plates 102R and 102L, respectively of the plunger end sections 96 and 98, include profiles located forwardly of the connection frame 70 that are each defined by top and bottom horizontal edges joined to a vertical edge. Respectively joined to this profile of the plates 102R and 102L are outwardly projecting flanges 130R and 130L. The flanges 130R and 130L define vertical, rearwardly facing, crop-engaging surfaces 132R and 132L, with stiffness being afforded to the plates 102R and 102L by forming the flanges so that they define upper, rearwardly opening U-shaped pockets 134R, 134L and lower, rearwardly opening, U-shaped pockets 136R and 136L in the crop-engaging surfaces. The vertical crop engaging surfaces 132R and 132L respectively include upper sections located above the upper pockets 134R and 134L that are provided with three carriage bolt mounting holes 136 located in a triangular pattern, and art outer pair of outer bale corner-forming plunger teeth 138 are each provided with three mounting holes which are aligned with the holes 136 and respectively receive a set of three carriage bolts 140 having threaded ends on which nuts 142 are provided for holding the plunger teeth 138 in place so that they project upwardly and rearwardly from an upper rear corner of the flanges 130R and 130L. For the sake of clarity, only the tooth 138 of the plunger end section 98 is shown. The flanges 130R and 130L also include respective horizontal bottom sections having rear end regions provided with a pair of mounting holes 144, with outer horizontal plunger knife segments 146 being respectively bolted to the bottom flange sections by bolts (not shown) projecting upwardly through holes provided in the knife segments 146 in alignment with the holes 144, with nuts being received on threaded upper ends of the bolts to hold the knife segments 146 in place. For the sake of simplicity, the knife segments 146 appear only in FIG. 3.

The plunger middle sections 100 are spaced transversely from each other and from the plunger end sections 96 and 98 by equal amounts so as to define six vertical, needle clearance slots 148 for permitting passage of the twine-delivery needles 50 for delivering twine to the twine knotting assembly 52 during tying of twine about a finished bale 46. Each plunger middle section 100 is fabricated as a casting defining transversely spaced right- and left-hand, vertical sides 150R and 150L (see FIG. 6) joined by a vertical rear side 152 that defines a crop-engaging surface. The tops of each of the sides 150R and 150L are horizontal and include respective upper, thickened front regions 154R and 154L having vertical front surfaces provided with horizontal, threaded bores 156. The sides 150R and 150L respectively include bottom rear inwardly offset regions 158R and 158L having bottom regions joined by a horizontal mounting pad 160 containing vertical threaded bores 162, with a horizontal plunger knife section 164 being secured to each pad 160 by a pair of bolts (not shown). The sides 150R and 150L have bottom edges which extend first horizontally from the rear end and then are inclined upwardly and forwardly to front ends of thickened lower front regions 166R and 166L that extend horizontally toward the rear and have vertical forward surfaces that are co-planar with the vertical front surfaces of the thickened front regions 154R and 154L. A further set of horizontal threaded bores 156 are provided in the front surfaces of the thickened lower front regions 166R and 166L. The rear surface of the upper thickened regions 154R and 154L of each plunger section 100 is disposed in engagement with the rear surface of the vertical plate 78 of the upper cross member 72 of the frame 70, while the rear surface of the lower thickened regions 166R and 166L of each plunger section 100 are disposed in engagement with the rear surface of the vertical plate 84 of the lower cross member 74. The vertical plate 78 of the upper cross member 72 is provided with a plurality of horizontal holes 168 that are respectively axially aligned with the upper set of threaded bores 156 of each of the middle plunger sections 100, while the vertical plate 84 of the lower cross member 74 is provided with a plurality of horizontal holes 170 that are respectively axially aligned with the lower set of threaded bores 156 of each of the plunger sections 100. A plurality of bolts 172 project rearwardly through the horizontal holes 168 and 170 and are threaded into the holes 156 (the bolts 172 that extend through the vertical plate 84 are not visible) thereby securing the middle plunger sections 100 to the frame 70.

As can be seen in FIGS. 2 and 3, the upper rear region of the middle plunger sections 100 are each provided with a triangular arrangement of carriage bolt holes 174, and a plurality of middle plunger teeth 176 are respectively provided with matching sets of holes and receive mounting bolts 178 that project rearwardly through the holes 174 in the plunger sections 100 and in the matching holes provided in the plunger teeth 176, with nuts 180 being received on rear threaded ends of the bolts so as to secure the teeth 176 in place where they project upwardly and rearwardly from the middle plunger sections 100.

Thus, it will be appreciated that because the plunger 42 uses cast sections in place of complex weldments, as used in the prior art, part count and complexity is reduced. Fewer and simpler plunger components reduce manufacturing costs by decreasing assembly time, reducing floor space requirements, and eliminating fabrication operations. Increased stiffness results in smaller plunger knife deflection and increased cutting efficiency during flake cutoff. Furthermore, if the plunger 42 is damaged, service to individual plunger sections 96R, 96L or 100 can be performed often without removing the plunger 42 from the baling chamber 18.

Having described the preferred embodiment, it will become apparent that various modifications can be made without departing from the scope of the invention as defined in the accompanying claims.

The invention claimed is:

1. A modular baler plunger comprising: an upright carrier frame extending transversely to a direction of intended reciprocation of said plunger; a plurality of separate upright plunger sections being spaced transversely from each other so as to define a needle pathway between adjacent plunger sections; said plunger sections including right and left, upright plunger end sections respectively releasably secured to opposite end regions of said carrier frame, and including a plurality of identical, parallel upright, plunger middle sections having respective front end regions, as considered when the plunger is in use on a baler, releasably connected to said carrier frame, wherein said upright carrier frame includes a plurality of transversely spaced apart connecting rod mounting bushings for receiving mounting pins for connecting left and right connecting rods to the bale plunger.

2. The modular baler plunger, as defined in claim 1, wherein said plunger sections are castings.

3. The modular baler plunger, as defined in claim 1, wherein said plunger end sections are each provided with horizontal cylindrical receptacles for receiving guide roller axles.

4. The modular baler plunger, as defined in claim 1, wherein said carrier frame includes vertically spaced, top and bottom cross members; and said plunger end sections and said plunger middle sections being bolted to said top and bottom cross members.

5. The modular baler plunger, as defined in claim 4 wherein a top region of each of said plunger end sections is provided with a frame mounting pad; and said top cross member of said carrier frame having opposite ends respectively in engagement with and secured to said mounting pad.

6. The modular baler plunger, as defined in claim 5, wherein said mounting pad is L-shaped with long and short legs of the L being respectively disposed horizontally and vertically; and said upper cross member having vertical and horizontal surfaces respectively engaging, and being secured to said legs of said mounting pad.

7. The modular baler plunger, as defined in claim 4 wherein said right and left plunger end sections are respectively secured to right and left ends of said bottom cross member of said carrier frame.

8. The modular baler plunger as defined in claim 4 wherein said plunger middle sections have respective front ends secured to said top and bottom cross members.

* * * * *